US007894943B2

(12) United States Patent
Sloup et al.

(10) Patent No.: US 7,894,943 B2
(45) Date of Patent: Feb. 22, 2011

(54) REAL-TIME GLOBAL OPTIMIZATION OF BUILDING SETPOINTS AND SEQUENCE OF OPERATION

(76) Inventors: Charles J. Sloup, 8719 Dupont St., Omaha, NE (US) 68124; Daniel Karnes, 7704 Richmond Dr., Omaha, NE (US) 68134; Gregor P. Henze, 995 Gillaspie Dr., Boulder, CO (US) 80305

(*) Notice: Subject to any disclaimer, the term of this patent is extended or adjusted under 35 U.S.C. 154(b) by 1230 days.

(21) Appl. No.: 11/171,603

(22) Filed: Jun. 30, 2005

(65) Prior Publication Data
US 2007/0005191 A1 Jan. 4, 2007

(51) Int. Cl.
*G05B 19/04* (2006.01)
*G05D 23/19* (2006.01)
*G05B 19/18* (2006.01)
*G21C 7/36* (2006.01)
*F25B 29/00* (2006.01)

(52) U.S. Cl. .................. 700/276; 165/257; 236/91 F; 376/217; 700/2

(58) Field of Classification Search ................ 700/276, 700/2; 376/217; 236/91 F; 165/257
See application file for complete search history.

(56) References Cited

U.S. PATENT DOCUMENTS

| 2,842,311 | A | 7/1958 | Petrie |
| 2,972,447 | A | 2/1961 | White |
| 3,916,445 | A * | 10/1975 | Alliston et al. ............ 376/217 |
| 4,040,565 | A | 8/1977 | Christiansen |
| 4,089,462 | A | 5/1978 | Bradford |
| 4,176,785 | A | 12/1979 | Allard et al. |
| 4,200,910 | A | 4/1980 | Hall |
| 4,210,957 | A | 7/1980 | Spethmann |
| 4,215,408 | A | 7/1980 | Games et al. |
| 4,217,646 | A | 8/1980 | Caltagirone et al. |
| 4,276,925 | A | 7/1981 | Palmieri |
| 4,363,441 | A | 12/1982 | Feinberg |
| 4,463,574 | A | 8/1984 | Spethmann et al. |
| 4,522,333 | A | 6/1985 | Blau, Jr. et al. |

(Continued)

OTHER PUBLICATIONS

Newman-H.M., "Direct Digital Control of Building Systems, Theory and Practice", 1994, Wiley-Interscience Publication, pp. 39, 70,71,73-81,130-132,162,210-213.*

(Continued)

*Primary Examiner*—Albert Decady
*Assistant Examiner*—Tom Stevens
(74) *Attorney, Agent, or Firm*—Stinson Morrison Hecker LLP (57) ABSTRACT

A building heating/cooling system energy optimization method for a building having a heating/cooling system includes the steps of providing a mathematical model of the heating/cooling system, obtaining real-time weather information, reading the input water temperature (IWT), the output water temperature (OWT) and the supply air temperature (SA) output to the building, periodically transferring the IWT, the OWT and the SA to an optimization system which is operative to analyze the real-time data in coordination with the mathematical model by assigning at least three selected values in a range surrounding and including the current values of each of the IWT, the OWT and the SA and calculating the efficiency profile of the components of the heating/cooling system for each of the selected values, then cooperatively optimizing and selecting those values calculated to provide the highest efficiency profile, then periodically resetting the system values to those selected by the optimization system.

23 Claims, 5 Drawing Sheets

U.S. PATENT DOCUMENTS

| | | | |
|---|---|---|---|
| 4,623,969 | A | 11/1986 | Bensoussan et al. |
| 4,674,027 | A | 6/1987 | Beckey |
| 4,784,212 | A | 11/1988 | Brimer et al. |
| 5,105,366 | A | 4/1992 | Beckey |
| 5,148,977 | A | 9/1992 | Hibino et al. |
| 5,236,477 | A | 8/1993 | Koketsu |
| 5,261,483 | A * | 11/1993 | Imaoka ............... 165/219 |
| 5,289,362 | A | 2/1994 | Liebl et al. |
| 5,337,955 | A * | 8/1994 | Burd ............... 236/91 F |
| 5,682,949 | A | 11/1997 | Ratcliffe et al. |
| 5,817,958 | A * | 10/1998 | Uchida et al. ............ 73/865.9 |
| 5,909,378 | A | 6/1999 | DeMilleville |
| 5,950,709 | A | 9/1999 | Krueger et al. |
| 6,095,426 | A | 8/2000 | Ahmed et al. |
| 6,098,893 | A | 8/2000 | Berglund et al. |
| 6,263,260 | B1 | 7/2001 | Bodmer et al. |
| 6,366,832 | B2 | 4/2002 | Lomonaco et al. |
| 6,402,043 | B1 | 6/2002 | Cockerill |
| 6,418,728 | B1 * | 7/2002 | Monroe ............... 62/3.2 |
| 6,449,533 | B1 | 9/2002 | Mueller et al. |
| 6,454,177 | B1 | 9/2002 | Sasao et al. |
| 6,591,620 | B2 | 7/2003 | Kikuchi et al. |
| 6,628,997 | B1 | 9/2003 | Fox et al. |
| 6,726,113 | B2 | 4/2004 | Guo |
| 6,785,592 | B1 * | 8/2004 | Smith et al. ............... 700/291 |
| 6,976,366 | B2 * | 12/2005 | Starling et al. ............... 62/126 |
| 7,343,226 | B2 * | 3/2008 | Ehlers et al. ............... 700/276 |
| 2003/0102383 | A1 | 6/2003 | Nanno et al. |
| 2003/0216837 | A1 | 11/2003 | Reich et al. |
| 2004/0173690 | A1 | 9/2004 | Takusagawa |
| 2009/0210081 | A1 * | 8/2009 | Sustaeta et al. ............... 700/99 |

OTHER PUBLICATIONS

Khan et al., Performance Analysis of a Residential Ground Source Heat Pump System with Antifreeze Solution 2004, School of Mechanical Engineering, Oklahoma State University, 10 pages.*

Taesler-R., "Climate and Building Energy Management", 1991, Swedish Meteorology and Hydrological, p. 599-608.*

Wetter, Michael, *GenOpt® Generic Optimization Program User Manual, version 2.0.0, Technical Report*, The Regents of the University of California (through Lawrence Berkeley National Laboratory), Jan. 5, 2004, 109 pages, Technical Report LBNL-54199.

Gibson, Gerald L, P.E., *A Supervisory Controller for Optimization of Building Central Cooling Systems*, ASHRAE Transactions, vol. 103 Part I. pp. 486-493, described in a printed publication more than one year before Jun. 30, 2005, the effective filing date of the present application.

Cascia, Mark A., *Implementation of a Near-Optimal Global Set Point Control Method in a DDC Controller*, ASHRAE Transactions, vol. 106 Part I. pp. 249-263, described in a printed publication more than one year before Jun. 30, 2005, the effective filing date of the present application.

*What is EnergyPlus?*, The Board of Trustees of the University of Illinois and The Regents of the University of California through the Ernest Orlando Lawrence Berkeley National Laboratory, described in a printed publication more than one year before Jun. 30, 2005, the effective filing date of the present application, 3 pg.

Rob Moult, *VAV Systems for office Buildings—Part I*, Air Conditioning and Refrigeration Journal, Jan. 1999, pp. 1-7.

Rob Moult, *Control Strategies for VAV Air Handling Units—Part 2*, Air Conditioning and Refrigeration Journal, Apr. 1999, pp. 1-11.

Rob Moult, *Control of Cooling-Only VAV Boxes—Part 3*, Air Conditioning and Refrigeration Journal, Jul. 1999, pp. 1-8.

Rob Moult, *Indoor Air Quantity Control of VAV Air Handling Units—Part 4*, Air Conditioning and Refrigeration Journal, Oct. 1999, pp. 1-11.

William J. Coad, PE, *Vav Systems*, Air Conditioning and Refrigeration Journal, Jul. 2003, pp. 1-11.

ASHRAE, *Building Energy Monitoring*. ASHRAE Fundamentals 2003, Chapter 40, 2001, 41 pg.

ASHRAE, *Supervisory Control Strategies and Optimization*. ASHRAE Fundamentals 2003, Chapter 41, 2001, 41 pg.

Braun, J.E., Klein, SA, Beckman W.A., & Mitchell, J.W., *Methodologies for Optimal Control of Chilled Water Systems without Storage*. ASHRAE Transactions, 1989, pp. 652-662, vol. 95, Part I.

Braun, J.E., Klein, SA, Beckman, W.A., & Mitchell, J.W., *Applications of Optimal Control to Chilled Water Systems without Storage*. ASHRAE Transactions, 1989, pp. 663-675, vol. 95, Part I.

Kaya, Azmi & Enterline, Larry, *Control and Optimization of Plant Compressors to Save Energy*, Proceedings of the 1984 American Control Conference, 1984, pp. 1829-1835, American Automatic Control Council.

* cited by examiner

REAL-TIME GLOBAL OPTIMIZATION OF BUILDING SETPOINTS AND SEQUENCE OF OPERATION

BACKGROUND OF THE INVENTION

1. Technical Field

The present invention is directed to the optimization of building energy use and, more particularly, to an improved optimization configuration whereby the building automation system, an energy simulation software package and an optimization engine work in concert with one another to examine variables relating to operational and environmental temperature values and cooperatively optimize those variables to generate setpoints for the building systems to reduce the building HVAC system's operational costs and increase the operating efficiency of the heating/cooling system of the building.

2. Description of the Prior Art

The need for more efficient and sustainable buildings has grown as the number of buildings being built and renovated continues to rise in the presence of sharply rising energy costs. Building owners react to increasing utility costs by demanding better designs from engineering professionals yet standard practice has inherent limitations to the overall benefit that can be provided building owners. Accordingly the HVAC industry has attempted to develop HVAC optimization systems and techniques that allow the building owner to reduce energy costs, a long-felt need which has yet to be fully addressed.

The prior art discloses that in a majority of the optimization techniques reviewed each control loop is optimized independently of the other control loops, hence the label "subsystem optimization". For example, one technique might involve optimizing the chilled water plant independent of the air-handling unit (AHU). While this allowed for a generic or "one size fits all" approach, there are inherent problems in this approach which do not fully address and solve the need for optimization and efficiency demanded in today's market. For example, the prior art approach described above will often result in control loops acting against one another, as the independent optimization of the control loops commands, as when the optimization system resets the chilled water temperature to reduce chiller energy consumption without recognizing the impact on the air handler unit (AHU).

Subsystem optimization by its very nature encourages each subsystem to reduce its workload without recognizing that if certain systems are pushed harder to enable other systems to work even less additional savings are possible. In fact, some subsystems can be pushed beyond their design load due to a factor attributable to the manufacturing process. For example, if a chiller requires a 67 horsepower motor to meet the design load, the manufacturer is going to install a 75 horsepower motor because it is the next larger size available. The project electrical engineer in turn has to size the electrical service to serve this motor by code.

Therefore, there is a need for an integrated/comprehensive view of building energy consumption based on system capacities that can adapt to any HVAC system configuration and yet is independent of proprietary features of a specific manufacturer's equipment.

The prior art also discloses that some optimization techniques utilize room setpoint changes to minimize energy costs (usually by reducing demand). Room setpoint, generally, is not the best indicator of efficiency of the HVAC system, but rather is indicative of the comfort level within the building. Therefore, it is not the best device by which to effectuate optimization of efficiency, and therefore is best not included as one of the interactive loops in an optimization system.

The prior art also discloses that some optimization techniques involve the direct reprogramming of automation controllers for global optimization techniques. While this allowed for self-contained programming, there are inherent problems such as the computing load placed on building automation controllers, the difficulty of executing intricate predictive programming in control processors and the programming of software made for feedback applications. Therefore there is a need to migrate the information into an environment built for generation of energy utilization estimates.

The prior art also discloses that some optimization techniques involve supervisory control such as artificial neural network (ANN) supervision of automation controllers for global optimization techniques. ANNs utilize fundamentally different logic than is shown in the present invention. ANNs have many additional applications not related to building energy optimization and differ in concept from the present invention. Prior research has shown that commercial ANN-based products can successfully save energy in buildings, but the present invention will not feature nor discredit ANN algorithms. Historically, the building industry has not widely accepted optimization featuring artificial neural networks, but its usability was not examined here due to the basic difference in approach as compared to the present invention. It is an object of the invention be an improved and relatively simple optimization configuration and ANN-based approaches represent a smaller niche of techniques which do not compare directly in line with the present invention.

There is therefore a need to:

1. Determine another method for predicting energy usage.

2. Determine a method that is simple to use, from the building engineer to the contractor to the owner.

3. Execute the evaluation quickly.

The prior art also discloses applications which optimize chiller plants serving manufacturing facilities by utilizing supervisory control. The first feature of the prior art that introduces some inaccuracy into the energy savings calculation is the reliance on weather forecasts. Not only do the weather prediction tools have an associated inaccuracy but there are also questions regarding the correlation of a "local" forecast with the actual site conditions impacting variables. For example, if an AHU is sitting on a black roof on a summer day, the intake air may be far warmer than the selected forecast value.

The second feature of the prior art that introduces some inaccuracy into the energy savings calculation is the reliance on predicted load. While it may be possible to accurately predict the load on a manufacturing plant where a significant majority of the load is due to equipment that is operating on a 24/7 basis, other facilities have a much more diverse profile including elements such as solar loading, equipment, lights and people which do change significantly between weekday and weekend profiles. These prior art applications also appear to focus on finding the most efficient chiller staging scenario without extending the analysis to consider variations in chiller/condenser setpoints. And, last but not least, these applications were limited to only considering the optimization of the plant without extending the analysis to consider the impact of the AHU on the total energy balance as well as any system-limiting factors generated by the air terminal units typically found in most AHU systems. Therefore, there is a need to utilize real-time weather and load information to improve the accuracy of the calculation.

Therefore, an object of the present invention is to provide an improved energy optimization system for use with heating and cooling systems for buildings.

Another object of the present invention is to provide an improved energy optimization system which will examine variables relating to operational and environmental temperature values and cooperatively optimize those variables to generate setpoints for the building systems to reduce the building HVAC system's operational costs and increase the operating efficiency of the heating/cooling system of the building.

Another object of the present invention is to provide an improved energy optimization system which works in cooperation with the building automation system to ensure compatibility with building systems generally regardless of the manufacturer.

Another object of the present invention is to provide an improved energy optimization system which simultaneously optimizes the input water temperature (IWT) of said heating/cooling system prior to adjustment of the water temperature, the output water temperature (OWT) after adjustment of the water temperature by said heating/cooling system and the supply air temperature (SA) output to the building via the at least one air handling unit to increase the operating efficiency of the heating/cooling system of the building.

Finally, an object of the present invention is to provide an improved energy optimization system which is relatively simple and straightforward in implementation and is safe, efficient and effective in operation.

SUMMARY OF THE INVENTION

The present invention provides a building heating/cooling system energy optimization method for a building having at least one air handling unit (AHU) and a heating/cooling system including at least a condenser unit, a heat transfer unit and a cooling unit operative to circulate water for heating and cooling of the building, the method including the steps of providing a mathematical model of the heating/cooling system including at least the efficiency profile of the components of the heating/cooling system and obtaining real-time weather information including at least outside temperature and outside humidity. The next step would involve the reading of the input water temperature (IWT) of the heating/cooling system prior to adjustment of the water temperature, the output water temperature (OWT) after adjustment of the water temperature by the heating/cooling system, the supply air temperature (SA) output to the building via the at least one air handling unit and the ambient air temperature (AA) within the building and transferring the real-time weather information, the IWT, the OWT, the SA and the AA, collectively the real-time data, to an optimization system, the optimization system operative to analyze the real-time data in coordination with the mathematical model by assigning at least three selected values in a range surrounding and including the current values of each of the IWT, the OWT and the SA for each of the IWT, the OWT and the SA and calculating the efficiency profile of the components of the heating/cooling system for each of the at least three selected values for each of the IWT, the OWT and the SA. The values calculated to provide the highest efficiency profile of the components of the heating/cooling system would then be selected by cooperatively optimizing each of the IWT, the OWT and the SA and the IWT, the OWT and the SA would be periodically reset to the values selected by the optimization system to generally maximize the efficiency profile of the components of the heating/cooling system.

The present invention as thus described has many advantages over those devices found in the prior art. The primary difference from the prior art and the present invention rests in the dependency of the setpoints on the other building mechanical loops. A primary goal of this invention is to allow each mechanical loop to perform with the best combined operational scheme with all three loops under consideration in real-time, namely the supply air temperature, input water temperature and the output water temperature, which in the cooling mode would be the supply air temperature, chilled water temperature and condenser water temperature. This will reduce the chance for different control loops to fight against one another, improving on the significant shortcomings of the prior art. Also, the optimization system of the present invention is designed to focus virtually solely on the optimization of energy usage without sacrificing space temperature criteria, namely the room setpoint, which is the only variable directly set by the space occupant, and therefore room setpoint is not one of the monitored control loops. Of course, however, sequences which allow room setpoint changes are certainly compatible with this system but do not comprise significant portions of the present invention. Finally, the combination of features found on the present invention render the invention far more effective and easy to use than those devices found in the prior art. Therefore, the present invention provides a substantial improvement over those methods and control systems found in the prior art.

DESCRIPTION OF THE PREFERRED EMBODIMENT

Figure 5:
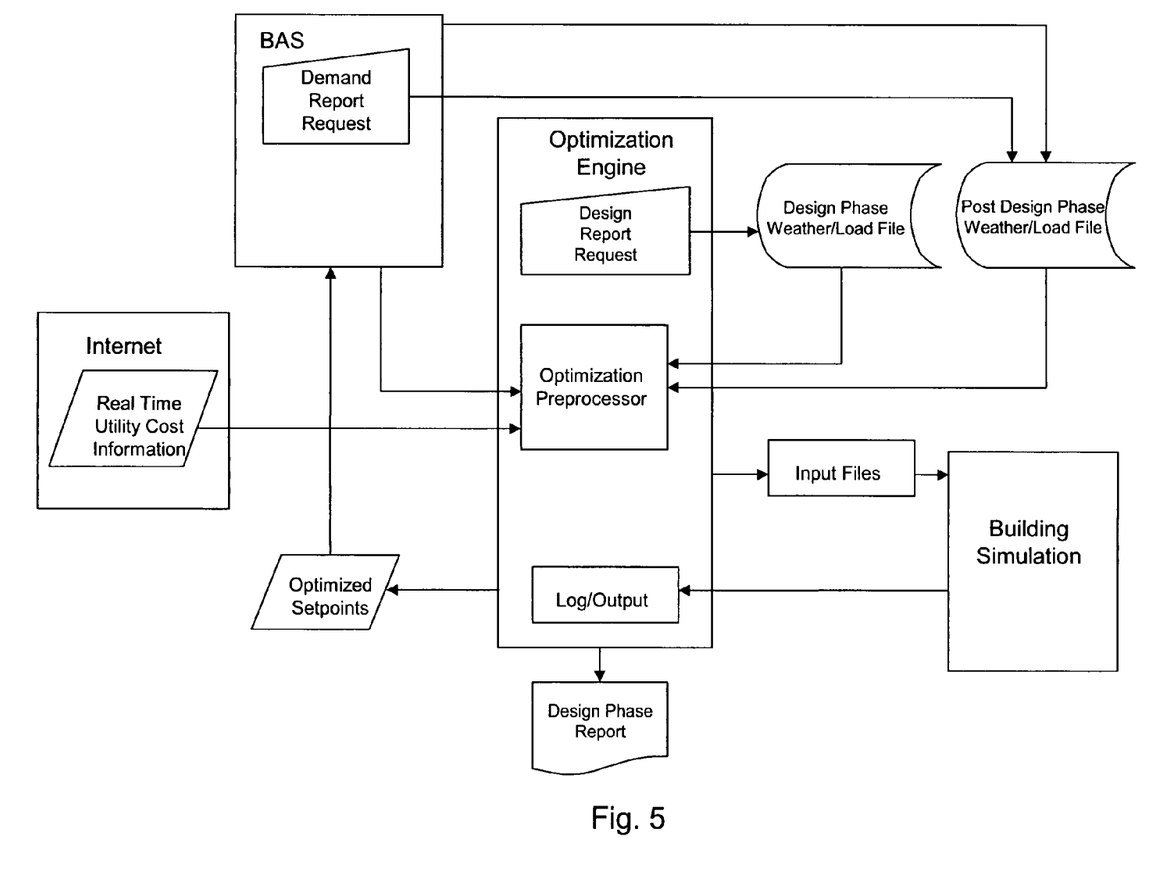
FIG. 5 is a general flow diagram of the system of the present invention.

The improved optimization configuration of the present invention is best shown in FIG. 5 as including a building automation system, energy simulation software and an optimization engine working in concert with one another.

In order to address the need for an integrated/comprehensive view of building energy consumption, this configuration solves the optimization of interactive loops simultaneously to ensure the control loops are working in concert with one another while reducing localized minimums and maintaining maximum accuracy. It should be noted, however, that in especially large facilities, there may be the need to solve multiple global problems in several smaller parts and sum the results and while this may speed up the calculations it may also add inaccuracy to the result, and therefore it is preferred that the following description of the preferred method of the present invention be applied whenever possible.

Building Automation System (BAS)
1. General Description is a Direct Digital Control (DDC) System utilizing sensors/actuators/controllers/operator workstation and a network to tie all the elements together as is the building industry's standard of care. This network will either incorporate a computer on site to perform the optimization calculations or include a gateway to the Internet for access to an offsite computer to perform the optimization calculations. Of course, the exact configuration of this linkage is not critical to the present invention so long as the functionality of the present invention is not degraded. This basic configuration can be applied to all control system manufacturers.

2. The BAS will transfer current building operation characteristics such as weather and equipment operational characteristics such as AHU discharge setpoints to the optimization preprocessor. This is a nontraditional feature for the controls contractors, yet should be relatively simple to implement.

3. The BAS will also receive optimized setpoints and sequences of operation based on recommendations of optimization engines. This likewise is a nontraditional feature for the controls contractor. However, with the movement of calculations to supervisory controllers, the control programming will actually become simpler.

4. The majority of the BAS configuration would be of the standard type used in the prior art but a critical feature of the present invention is direct measurement of heat gain in the building space (solar+equipment+lights+people), which in the preferred embodiment would be the taken by a reading at the air terminal unit discharge sensor within the building. When the discharge sensor is compared with the room temperature sensor the room's sensible heat load can be determined. It should be noted, however, that alternate methods of directly measuring heat load are known to those skilled in the art of building control systems, but the inclusion of the comparative reading method for determining actual room and zone load is believed to be inventive in nature and is an important feature of the present invention. This feature is important to bypass the heat load determination/surface manager found in the energy simulation component.

5. As the number of points that are monitored increases, the accuracy of the prediction likewise increases. For example, the energy simulation package may have a theoretical pump energy consumption profile which can be checked against a measured energy consumption value.

Optimization Program

1. General description: The relationship of the optimization engine to the other components can be found in FIG. 5, as can a detailed view of this component of the present invention. Of course, the modifications to the design of the optimization program and its interface with the building automation system as well as the simulation program is well within the purview of the present invention, but it has been found that the configuration disclosed is well suited to the present use wherein computing load is external to the building automation controllers.

2. Optimization engines are typically utilized in academic or other types of research, with some products being better suited for certain applications than others. Optimization engines, however, are generally not familiar to consulting engineers, building owners and contractors as a whole. The utilization of a optimization application program (engine) acting as a template reduces the need for the labor intensive development of a custom application.

3. With that in mind, the preferred embodiment utilizes an optimization engine called Gen Opt which was originally developed by Lawrence Berkley National Laboratory and has the ability to interface with building simulation programs. This program was chosen for several reasons, but the most significant reason is that it is very efficient and functional and has the ability to interface with multiple programs.

4. How it works:
  a. Information from the building automation system is pulled into the optimization interface simulation input template.
    i. The number of independent variables is limited by actual operating conditions based on real-time data. For example, the independent variables being evaluated during the winter heating season are different than the independent variables used in the summer cooling season. Also, the input water temperature (IWT) of the heating/cooling system may be understood to be the condenser water temperature before cooling and the pre-heating temperature before heating, and likewise the output water temperature (OWT) may be understood to be the chiller water temperature after cooling and the post-heating temperature after heating.
    ii. The range of the independent variables is limited in order to reduce processing time as well as give the automation controllers small step changes that do not result in significant disturbances to control system stability.
    iii. It is at this stage that underlying constraints, such as system capacities, are taken into account. Boundaries (box constraints) can be imposed on the independent variables as well as dependent variables being limited by penalty or barrier functions as a result of programming.
  b. Optimization is performed.
    i. The optimization engine automatically writes the input files for the simulation. The generated input files are based on the input template files. The simulation calculation is performed.
    ii. The optimization engine automatically retrieves the output of the simulation package, checks to make sure results are within predefined constraints and stores the results in an output log.
    iii. The optimization engine then determines the new set of input parameters for the next run, utilizing the optimization algorithm to determine the lowest operational cost.
    iv. Once the lowest cost of operation is determined, the system setpoints associated with the lowest operational cost are delivered to the BAS.
      a. In the BAS the existing setpoints are replaced by the new optimized setpoints for utilization in the control loops.
    b. Example:
      i. Current building operation has a chiller evaporator outlet water temperature of 45° F., a condenser inlet water temperature of 85° F., an AHU discharge temperature of 55° F. and a building load of "X". These variables are moved from the building automation system to the optimization engine.
      ii. The optimization engine runs a simulation utilizing current conditions described above to establish an energy use baseline and stores the results.
      iii. The optimization engine then runs a simulation utilizing a chiller evaporator outlet water temperature of 46° F., all other variables remain the same and stores the results. This is repeated for all variables and all combinations of variables until an overall minimum cost is found by solving the equation of minimum cost for all three values at the same time cooperatively.

iv. The optimization engine might then determine that keeping the evaporator outlet water temperature of 45° F. at its current setpoint, changing the condenser inlet water temperature to a setpoint of 84° F. and changing the AHU discharge temperature to 54° F. will satisfy the load imposed by "X" and thus save the most energy when compared to the baseline.

v. These setpoints are then sent back to and utilized by the building automation system which updates the settings to optimize operation of the heating/cooling system.

Simulation

1. General description. The relationship of the simulation program to the other components can best be seen in FIG. 5 of this disclosure and a more detailed view of this component can be found in FIG. 2. Of course, the modifications to the design of the simulation program and its interface with the optimization program and the building automation system is well within the purview of the present invention, but it has been found that the configuration disclosed is well suited to the present use wherein computing load is external to the building automation controllers.

2. Simulation programs are common in the building industry and include many variations applied to many different simulation situations and utilized by many different developers and designers in the industry. Traditionally, the life of the energy model ends when the design documents are complete, however, under this invention, the energy model continues on to become the basis of cost calculation. The design engineer will need to be aware of this "extended use" issue when developing the model.

3. The preferred embodiment utilizes a simulation program called Energy Plus. Energy Plus was developed by the US Department of Energy and was chosen for use with the present invention for several reasons, most important of which is the availability of a modifiable interface between the simulation and optimization systems.

Figure 1:
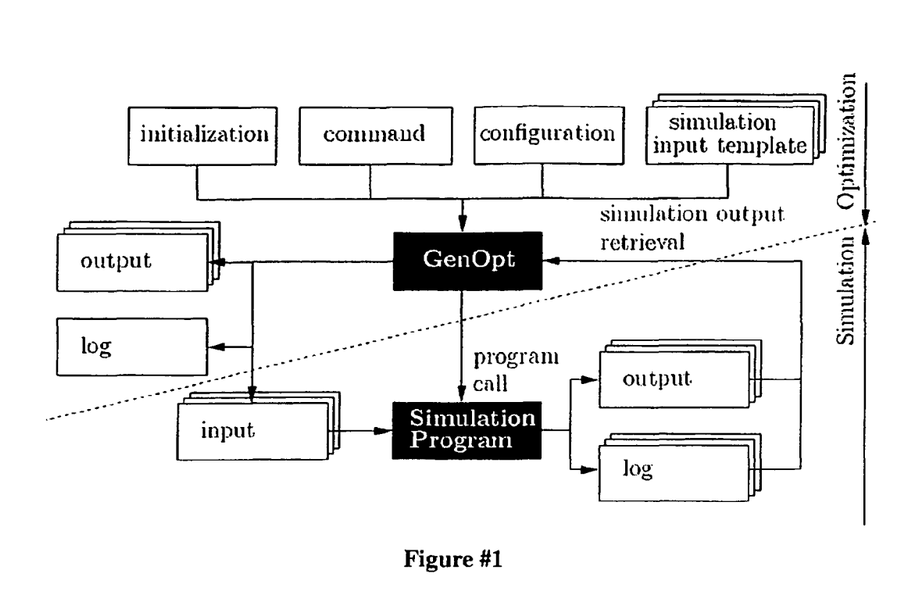
FIG. 1 is a diagrammatic chart depicting the GenOpt simulation program interface.
Figure 2:
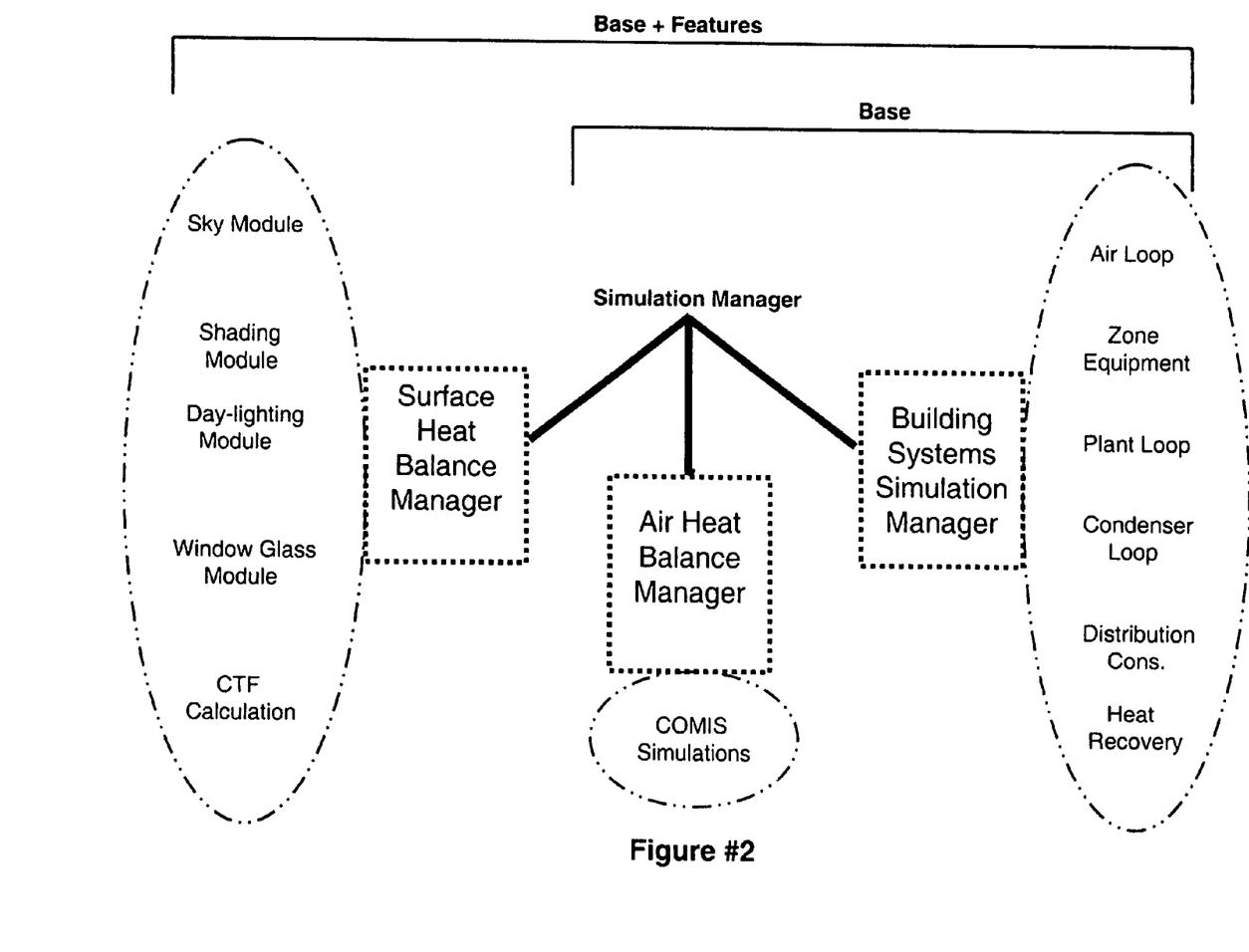
FIG. 2 is a detail diagrammatic chart showing the interconnection between the components of the present invention.

4. How it works
 a. Energy Plus gets information from Genopt.
 b. Energy Plus calculates energy usage.
 c. Sends results back to Genopt.
  i. The majority of the simulation package would be of the standard type used in the prior art but a critical feature of the present invention is the ability to bypass the room load calculation and "warmup" cycles. FIG. 2 indicates that room load calculation consists of the Surface Heat Balance Manager which in the preferred embodiment would require reprogramming of the simulation manager.
  ii. The room load calculation can be bypassed by utilizing a direct measurement of the cooling or heating load by utilizing a air terminal unit discharge sensor described in the BAS section above in lieu of calculating heat transfer functions for each surface involved, thereby significantly increasing calculation speed. However, the inclusion of any such reconfiguration is believed to be inventive in nature and is an important feature of the present invention, as the specifics of the reconfiguration do not impact the inventive features that the reconfiguration itself affords.
  iii. Because the room load calculation is eliminated, the calculation of room load, which is dependent on time delays due to mass effects of the physical system, "warmup cycles" are also eliminated as unnecessary to prime the calculations, thereby further increasing calculation speed, the reconfiguration of which will be determined through further experimentation.
  iv. If a particular building owner makes the decision to only optimize the cooling side of the energy use equation it may be possible to eliminate the air terminal unit discharge sensor and utilize the VAV box damper position as an indicator of building cooling load and subsequent limit of the supply air temperature based on the measured sensitivity of the maximum damper position with supply air temperature.

5. Advantages
 a. The computing platform and interface is specifically designed for estimating elements.
 b. The programs are tested for interaction.
 c. The system utilizes calibrated models with a high degree of accuracy and does not require a learning curve.

6. Controls Loops
 a. The following is a detailed description of the three major control loops found in the preferred embodiment. All control loops including minor control loops will also have similar criteria.
  i. Chiller Evaporator Outlet Setpoint Temperature Constraints/Boundaries:
   a. Optimization range is higher and lower than design setpoint.
   b. Raising temperature does not have a high limit defined in absolute terms. The upper boundary is found via polling the AHUs attached to the system to determine the cooling coil with highest percentage open value.
   c. Lowering temperature does not have a low limit defined in absolute terms. The lower boundary is found via polling the attached AHUs to determine if the cooling coil delta Ts are falling below design criteria which would be an indication that laminar flow is taking place in the cooling coil water circuit.
   d. Effects at ATU: No direct effects.
   e. Effects at AHU: Raising the chilled water temperature will cause the cooling coil valve to open until it is 100% open. Conversely lowering the temperature will cause the cooling coil valve to close.
   f. Effects on Chiller: Raising the chilled water temperature will cause the chiller to run more efficiently and the pumping to run less efficiently.
   g. Base Case sequence of operation is a fixed setpoint.
   h. Optimized Case: Ability to coordinate setpoint with other setpoints to realize savings.
   i. Correlation of BAS points with loads program input points: Direct Correlation.
  ii. Condenser Water Control Loop Constraints/Boundaries:
   a. Optimization range is higher and lower than design setpoint.
   b. Raising temperature does not have a high limit defined in absolute terms. Upper boundary is found via polling the attached chillers.
   c. Lowering temperature does not have a low limit defined in absolute terms. Lower boundary is found via polling the attached chillers.
   d. Effects at ATU: No direct effects.
   e. Effects at AHU: No direct effects.

f. Effects on Chiller: Raising condenser water inlet temperature temperature will cause the chiller to run less efficiently.
g. Base Case sequence of operation is a fixed setpoint.
h. Optimized Case: Ability to coordinate setpoint with other setpoints to realize savings.
i. Correlation of BAS points with loads program input points: Direct Correlation.

iii. AHU discharge air temperature control loop Constraints/Boundaries:
   a. Optimization range is higher and lower than design setpoint.
   b. Raising temperature does not have a high limit defined in absolute terms. Upper boundary is found via polling the ATU's attached to the system to determine if space temperatures are being maintained.
   c. Lowering temperature does not have a low limit defined in absolute terms. Lower boundary is found via balancing the reheat needs against the fan power savings associated with lower airflow requirements.
   d. Effects at ATU: Raising AHU discharge temperature will cause the air-terminal unit dampers to open till 100% open.
   e. Effects at AHU: Raising discharge temperature will cause chilled water valves to close
   f. Effects on Chiller: Raising AHU discharge temperature will cause the chiller to run more efficiently and the pumping more efficiently because delta T can be increased.
   g. Base Case sequence of operation is a fixed setpoint.
   h. Optimized Case: Ability to coordinate setpoint with other setpoints to realize savings.
   i. Correlation of BAS points with loads program input points: Direct Correlation. [0102].

7. Three additional features of the present invention which are not critical to the operation of the invention but have been proven to be beneficial are the ability to integrate real-time utility costs into simulation, the ability to generate a design phase report and further the ability to demand reports from the system.
   a. The first feature provides information regarding electrical demand and what can be done to influence this dominant factor in the energy cost equation.
   b. Upon initiation at the BAS workstation, the optimization preprocessor will retrieve a post design weather/load file from an archive. This weather load file will contain a weather template for the location based on historical norms and this will not be adjusted for building specifics. The weather/load file will also contain a load template for the specific building which has been modified with archived realtime data provided by the building automation system. This adjustment based on realtime data calibrates the energy model rather than relying on educated guesses by the design engineer. This will require all of the simulation computing elements found in FIG. 2. This weather/modified load file will be used in lieu of the realtime data from the BAS (base configuration) so it can project out beyond current conditions.
   c. Example: The facility operations manager wants to know if it is cost-effective to change out filters thereby lowering static and in turn horsepower and in turn demand and in turn demand ratchet. If the cost of the filters and the labor to replace the filters is known, the simulation program can project the cost impact of the change in demand projected over the demand ratchet period brought back to a net present value. The same approach can be used to determine the speed at which emergency generators can be run in order to shed demand without exceeding emissions limits.
   d. The second feature is to provide a design phase report that can be used to project savings afforded by implementing the technique of the present invention and in turn calculate return on investment necessary for justification of additional capital costs. Upon initiation at the optimization workstation, the optimization preprocessor will retrieve a design phase weather/load file from an archive. This weather load file will contain a weather template for the location based on historical norms, this is not adjusted for building specifics. The weather/load file will also contain a load template for the specific building which has been generated by the facility design engineer This will require all of the simulation computing elements found in FIG. 2. This weather/modified load file will be used in lieu of the realtime data from the BAS (base configuration) so it can project out beyond current conditions.
   e. The third feature would reference future preferred embodiments, in which the optimization preprocessor would be connected to the Internet in order to obtain realtime utility cost information. Currently, real time pricing is only used by a few utilities but its use is growing. It is expected that use of realtime pricing will lead to further efficiency gains through use of the present invention, and thus its inclusion herewith is desirable.

Results Graph

Figure 3:
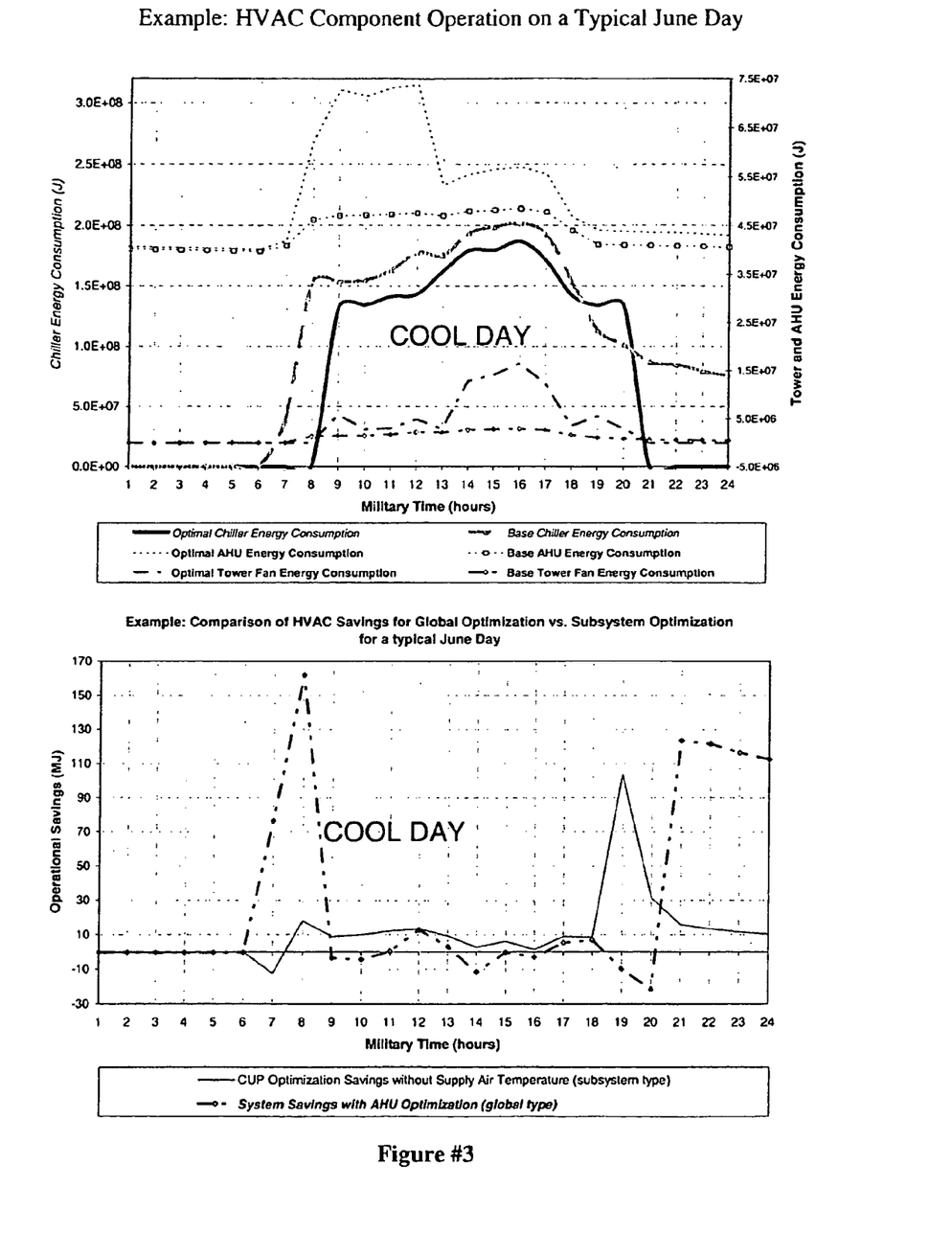
FIGS. 3 and 4 are optimization graphs showing how the present invention drives a standard HVAC system to increase efficiency.
Figure 4:
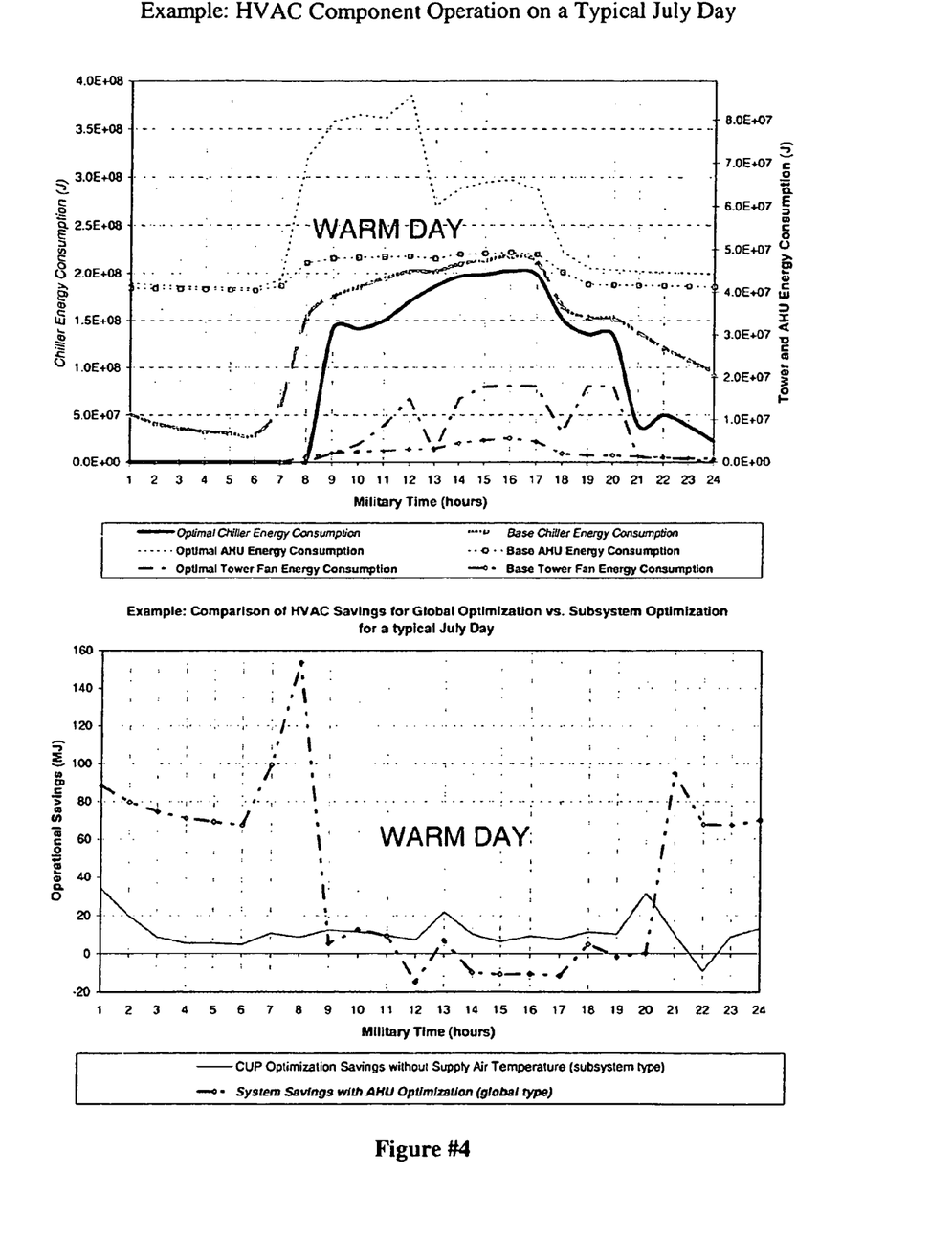

FIGS. 3 and 4 depict the cost savings potential of a 50,000 sf office building in the Midwest on a cool spring (FIG. 3) and a warm summer (FIG. 4) day while utilizing VAV (variable air volume) air distribution system. It should be noted that although all buildings will have unique profiles, the data shown in FIGS. 3 and 4 should provide a readily understandable example of how the present invention will maximize efficiency in a building equipped therewith. A summer design day was not included in the present disclosure because the opportunity to optimize equipment sized to handle the design load is negligible. One objective of this invention is to take advantage of the part load efficiency associated with equipment designed to accommodate a design day but operating in a part load manner. The other consideration in discounting the optimization on a design day takes into account the number of hours that equipment operates at a design condition. Given the fact that buildings operate at design conditions for only a few hours per year, less emphasis was placed on reviewing operations in this area.

The top chart of each of FIGS. 3 and 4 shows what each piece of cooling equipment is doing at a particular time. The bottom chart summarizes the energy savings potential optimization schemes incorporating different mechanical elements. The lower savings is associated with optimizing the chiller plant only. The upper savings is associated with optimizing the chiller plant and AHU in concert with one another. As should be obvious by the graphs, the additional savings potential is significant.

At first glance there appear to be instances in which the subsystem optimization is more effective than the global optimization because the global savings indicator falls below the subsystem indicator. This can be explained by the fact that these graphs represent the outcomes when setpoints are analyzed only four times per day. This means that in any six hour block, the area between the lines is a net positive that is a net cost savings. Further refinements in calculation resolution should eliminate this discrepancy.

It is therefore to be understood that numerous modifications, additions and substitutions may be made to the optimization configuration of the present invention which fall within the intended broad scope of the appended claims. For example, the timing of the setpoint checks and resets may be modified and changed on a case-by-case basis in order to maximize energy efficiency so long as the computing system and the BAS are not overtaxed. Also, the comparison of the input water temperature (IWT) of said heating/cooling system prior to adjustment of the water temperature, the output water temperature (OWT) after adjustment of the water temperature by said heating/cooling system, the supply air temperature (SA) output to the building via the at least one air handling unit may be modified to include more than three setpoint checks so long as the computing system is not overtaxed and the results of the simulation and optimization program operation can be delivered to the heating/cooling system in a timely and efficient manner. Finally, the specifics of the programming and operation of the present invention may be modified or changed so long as the intended function of determining a comprehensive overview of optimized energy building energy usage that is adaptable to almost any HVAC component configuration and calculating the optimized operational setpoints via use of realtime inputs, a mathematical model and an optimization engine is maintained.

There has therefore been shown and described an improved HVAC optimization system which accomplishes at least all of its intended objectives.

We claim:

1. A building heating/cooling system energy optimization method for a building having at least one air handling unit (AHU) and a heating/cooling system including a plurality of components comprising at least a condenser unit, a heating unit and a cooling unit, said method comprising the steps:

providing a mathematical model of the heating/cooling system including at least an efficiency profile of the components of the heating/cooling system;

obtaining real-time weather information including at least outside temperature and outside humidity;

reading an input water temperature (IWT) of said heating/cooling system, an output water temperature (OWT) of said heating/cooling system, a supply air temperature (SA) output to the building via the at least one air handling unit and an ambient air temperature (AA) within the building;

periodically transferring said real-time weather information, said IWT, said OWT, said SA and said AA, collectively real-time data, to an optimization engine, said optimization engine operative to analyze said real-time data in coordination with said mathematical model by assigning at least three selected values in a range surrounding and including current values of each of said IWT, said OWT and said SA for each of said IWT, said OWT and said SA and calculating the efficiency profile of the components of the heating/cooling system for each of said at least three selected values for each of said IWT, said OWT and said SA, then selecting those values calculated to provide a highest efficiency profile of the components of the heating/cooling system by cooperatively optimizing each of said IWT, said OWT and said SA; and periodically resetting each of said IWT, said OWT and said SA to said values selected by said optimization engine to generally maximize the efficiency profile of the components of the heating/cooling system.

2. The building heating/cooling system energy optimization method of claim 1 wherein said mathematical model of the heating/cooling system includes energy consumption ratings for components of the heating/cooling system.

3. The building heating/cooling system energy optimization method of claim 1 further comprising the steps of obtaining an ambient air temperature of a selected zone of the building, obtaining an air terminal unit discharge temperature within the selected zone within the building and comparing said ambient air temperature of the selected zone with said air terminal unit discharge temperature to determine the selected zone's sensible heat load.

4. The building heating/cooling system energy optimization method of claim 1 wherein said step of analyzing said real-time data in coordination with said mathematical model by assigning at least three selected values in a range surrounding and including current values of each of said IWT, said OWT and said SA for each of said IWT, said OWT and said SA and calculating the efficiency profile of the components of the heating/cooling system for each of said at least three selected values for each of said IWT, said OWT and said SA further comprises selecting first, second, and third values for comparison, the first value corresponding to the current value of each of said IWT, said OWT and said SA, the second value corresponding to the current value plus one degree Fahrenheit (1° F.) for each of said IWT, said OWT and said SA and the third value corresponding to the current value minus one degree Fahrenheit (1° F.) for each of said IWT, said OWT and said SA.

5. The building heating/cooling system energy optimization method of claim 1 wherein the step of periodically resetting each of said IWT, said OWT and said SA to said values selected by said optimization engine further comprises resetting each of said IWT, said OWT, and said SA to said values selected by said optimization engine hourly.

6. The building heating/cooling system energy optimization method of claim 1 wherein said real-time weather information comprises predicted weather information for obtaining mid to long term operational efficiency forecasts for operational planning purposes.

7. The building heating/cooling system energy optimization method of claim 1 wherein said optimization engine is further operative to coordinate multiple heating/cooling systems, analyze said real-time data in coordination with mathematical models of the multiple heating/cooling systems by assigning at least three selected values in a range surrounding and including current values of each of said IWT, said OWT and said SA of each of the multiple heating/cooling systems for each of said IWT, said OWT and said SA and calculating the efficiency profile of the components of each of the multiple heating/cooling systems for each of said at least three selected values for each of said IWT, said OWT and said SA, then selecting those values calculated to provide the highest efficiency profile of the components of the multiple heating/cooling systems by cooperatively optimizing each of said IWT, said OWT and said SA in the multiple heating/cooling systems jointly to coordinate operation of the multiple heating/cooling systems for maximum joint efficiency.

8. The building heating/cooling system energy optimization method of claim 1, further comprising the steps of obtaining and analyzing real-time utility cost information.

9. The building heating/cooling system energy optimization method of claim 8, wherein said real-time utility cost information is obtained over a data network.

10. The building heating/cooling system energy optimization method of claim 9, wherein said data network is the Internet.

11. The building heating/cooling system energy optimization method of claim 1, further comprising the steps of:
archiving said real-time data to create archived real-time data;
calibrating said mathematical model of said heating/cooling system using said archived real-time data; and
generating reports using said calibrated mathematical model in coordination with a weather template based on historical norms for a location of the building.

12. A building heating/cooling system energy optimization system for a building having at least one air handling unit (AHU) and a heating/cooling system including a plurality of components comprising at least a condenser unit, a heating unit and a cooling unit, said building heating/cooling system energy optimization system comprising:
a mathematical model of said heating/cooling system including at least an efficiency profile of the components of the heating/cooling system;
weather sensors for obtaining real-time weather information including at least outside temperature and outside humidity;
temperature sensors operative to read an input water temperature (IWT) of said heating/cooling system, an output water temperature (OWT) of said heating/cooling system, a supply air temperature (SA) output to the building via the at least one air handling unit and an ambient air temperature (AA) within the building; and
an optimization engine operative to periodically obtain said real-time weather information, said IWT, said OWT, said SA and said AA, collectively real-time data, analyze said real-time data in coordination with said mathematical model by assigning at least three selected values in a range surrounding and including current values of each of said IWT, said OWT and said SA for each of said IWT, said OWT and said SA and calculating the efficiency profile of the components of the heating/cooling system for each of said at least three selected values for each of said IWT, said OWT and said SA, and then selecting those values calculated to provide a highest efficiency profile of the components of the heating/cooling system by cooperatively optimizing each of said IWT, said OWT and said SA;
a controller operative to engage said heating/cooling system to periodically reset each of said IWT, said OWT and said SA to said values selected by said optimization engine to generally maximize the efficiency profile of the components of the heating/cooling system.

13. The building heating/cooling system energy optimization system of claim 12 wherein said optimization engine is further operative to select first, second, and third values for comparison, the first value corresponding to the current value of each of said IWT, said OWT and said SA, the second value corresponding to the current value plus one degree Fahrenheit (1° F.) for each of said IWT, said OWT and said SA and the third value corresponding to the current value minus one degree Fahrenheit (1° F.) for each of said IWT, said OWT and said SA.

14. The building heating/cooling system energy optimization system of claim 12, wherein said optimization engine is further operative to periodically obtain real-time utility cost information.

15. The building heating/cooling system energy optimization system of claim 14, wherein said optimization engine is operative to obtain real-time utility cost information over a data network.

16. The building heating/cooling system energy optimization system of claim 15, wherein said data network is the Internet.

17. The building heating/cooling system energy optimization system of claim 12 further comprising:
an archive of historical real-time data;
a calibrated mathematical model, wherein said mathematical model is calibrated using said archive of historical real-time data; and
wherein said optimization engine is further operative to analyze a weather template corresponding to a location of said building in coordination with said calibrated mathematical model and generate reports corresponding to said analysis.

18. A building heating/cooling system energy optimization method for a building having at least one air handling unit (AHU) and a heating/cooling system including a plurality of components comprising at least a condenser unit, a heating unit and a cooling unit, said building heating/cooling system energy optimization method comprising the steps of:
providing a mathematical model of the heating/cooling system including at least efficiency profiles of the components of the heating/cooling system;
obtaining real-time weather information including at least outside temperature and outside humidity;
reading operational variables of the heating/cooling system components;
periodically transferring said real-time weather information and said operational variables to an optimization engine, said optimization engine is operable to:
a. select input parameters from said operational variables,
b. analyze said real-time weather information and said input parameters in coordination with said mathematical model by assigning at least three selected values in a range surrounding and including current values of each of said input parameters and calculating the efficiency profile of the components of the heating/cooling system for each of said at least three selected values for each of said input parameters,
c. select those values calculated to provide a highest efficiency profile of the components of the heating/cooling system by cooperatively optimizing each of said input parameters; and
periodically resetting each of said input parameters to said values selected by said optimization engine to generally maximize the efficiency profile of the components of the heating/cooling system.

19. The building heating/cooling system energy optimization method of claim 18, wherein said operational variables are selected from the group consisting of an input water temperature (IWT) of said heating/cooling system, an output water temperature (OWT) of said heating/cooling system, a supply air temperature (SA) output to the building via the at least one air handling unit, and an ambient air temperature (AA) within the building.

20. The building heating/cooling system energy optimization method of claim 18, further comprising the step of obtaining and analyzing real-time utility cost information.

21. The building heating/cooling system energy optimization method of claim 20, wherein said real-time utility cost information is obtained over a data network.

22. The building heating/cooling system energy optimization method of claim 21, wherein said data network is the Internet.

23. The building heating/cooling system energy optimization method of claim 18, further comprising the steps of:
- archiving said real-time weather information and said operational variables to create archived real-time weather information and archived operational variables;
- calibrating said mathematical model of said heating/cooling system using said archived real-time weather information and said archived operational variables to create a calibrated mathematical model; and
- generating reports using said calibrated mathematical model in coordination with a weather template based on historical norms for a location of said building.

* * * * *